May 26, 1970    H. HILDEBRAND ET AL    3,514,523

DIELECTRIC SPACER FOR COAXIAL CABLE

Filed May 24, 1968

INVENTORS
Helmut Hildebrand
Gerhard Ziemek
Friedrich Schatz
BY
ATTORNEY

United States Patent Office 3,514,523
Patented May 26, 1970

3,514,523
DIELECTRIC SPACER FOR COAXIAL CABLE
Helmut Hildebrand, Langenhagen, and Gerhard Ziemek and Friedrich Schatz, Hannover, Germany, assignors to Kabel-und Metallwerke Gutehoffnungshutte Aktiengesellschaft, Hannover, Germany, a corporation of Germany
Filed May 24, 1968, Ser. No. 731,951
Claims priority, application Germany, May 26, 1967, K 62,372
Int. Cl. H01b 11/18, 13/18
U.S. Cl. 174—28   5 Claims

ABSTRACT OF THE DISCLOSURE

Dielectric spacer means for coaxial cables which are constituted of a minimum amount of dielectric material, of a structure such as to minimize leakage losses, yet provide adequate mechanical load capacity so as to effectively space the inner and outer conductors of the cable.

BACKGROUND OF THE INVENTION

In coaxial high frequency cables it is known that the losses therein are made up of losses due to high-frequency resistance of the conductors and losses due to leakage from the dielectric means which spaces the outer conductor from the inner conductor. Such leakage loses have a substantial effect on the total losses, and their magnitude depends on the type of dielectric material used, the geometrical structure of the spacer and the volume of the spacer as compared to the total volume of the space between the conductors.

Thus, for low loss power transmission through a coaxial cable, it is necessary that a solid dielectric be used which has a small dielectric loss angle, a small dielectric constant and a volume which is minimal as compared to the total volume of the space between the conductors.

In particular, to meet the last mentioned requirement, it has been proposed to use dielectric discs suitably mounted on the inner conductor at determined axial spacings; the discs being formed of a minimum amount of material, and with openings in the discs to further reduce the quantity of material used.

Further, it is known to use as spacer means in coaxial cables, a solid dielectric strip arranged helically between the conductors and extending in full linear contact with opposed surfaces of the conductors. Also, spaced members interconnected at one end by a continuous strip has been used in spiral form as spacer means in coaxial cables.

However, with all the known dielectric spacer constructions, it has been found that the leakage losses are still relatively large. Also, such spacers are of a complicated construction, expensive to manufacture and of limited applicability to certain cable constructions such as those which have corrugated inner and/or outer conductors.

Accordingly, an object of this invention is to provide improved dielectric spacer means for coaxial cables which takes the form of a relatively thin dielectric tape having configurations which minimize leakage losses, yet provide good mechanical load capacity for maintaining the inner and outer conductors in spaced relation.

Another object of this invention is to provide spacer means of the character described which lends itself to use with corrugated as well as non-corrugated inner conductors.

Yet another object of this invention is to provide a spacer for coaxial cables which is relatively inexpensive to manufacture, is readily applied, and combines both optimum electrical and mechanical properties.

Other objects of this invention will in part be obvious and in part hereinafter pointed out.

DESCRIPTION OF THE PREFERRED EMBODIMENTS

Figure 1:
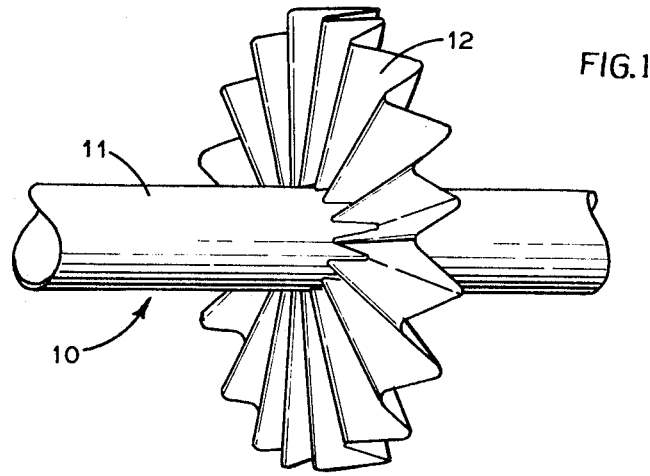
FIG. 1 is a side elevational view showing one embodiment of the spacer for coaxial cables, in accordance with the instant invention.

As shown in FIG. 1, 10 desginates a spacer construction for coaxial cables, wherein the usual inner conductor 11 has mounted thereon a dielectric tape member 12. Tape member 12 is formed of a suitable dielectric material such as synthetic resin or the like, is corrugated or pleated transversely of the length thereof and is in annular form with the inner edge portions thereof bearing on the outer surface of inner conductor 11.

The relatively thin edges of the member 12 minimizes the amount of solid material located adjacent the inner conductor 11, thereby minimizing leakage losses, yet shows a good mechanical stability due to the high section modulus of the corrugated or pleated structure. Further, by forming openings in the member 12, the net amount of material is further reduced, without adversely affecting the section modulus.

To further reduce leakage losses, the corrugations or pleats in member 12 may be formed in a manner such that the amplitude of the corrugations at the inner annular edge thereof approaches zero. This will take into account the recognition that leakage loss is maximum at the point of highest field strength in the dielectric and such maximum field strength occurs adjacent the inner conductor. Thus, by minimizing the amount of dielectric material adjacent the inner conductor, as by reducing the total linear extent of the inner annular edge of member 12, leakage losses are substantially reduced.

Figure 2:
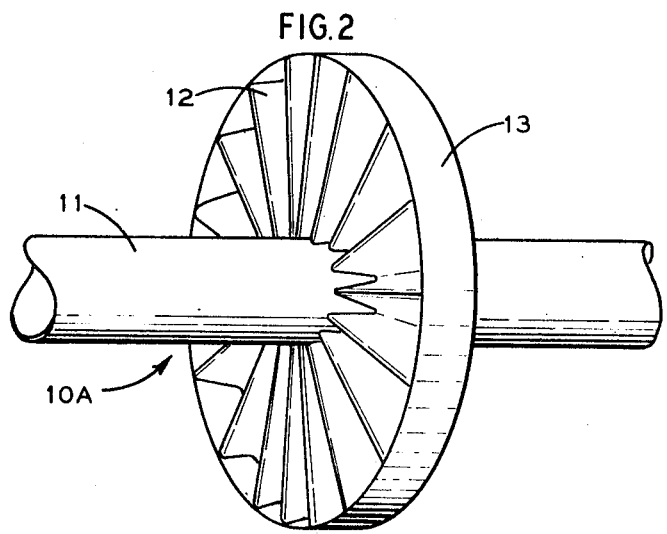
FIG. 2 is a view similar to that of FIG. 1, showing another form of the invention.

As shown in FIG. 2, a flat tape 13 may be secured to the peripheral outer edge portions of corrugated or pleated member 12, thus providing additional support for the outer conductor, not shown.

Figure 3:
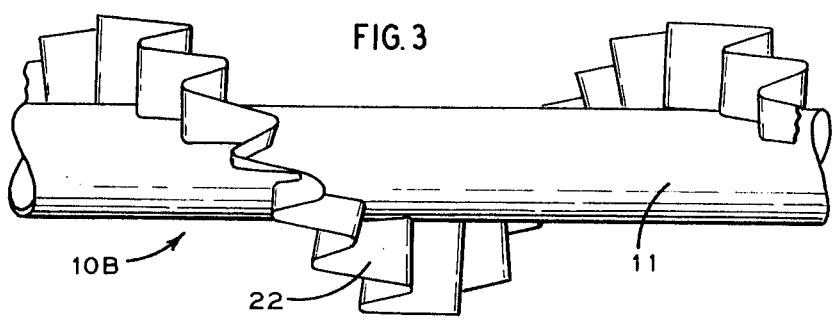
FIG. 3 is a view similar to that of FIG. 1, showing still another form of the invention.

Also, as indicated in FIG. 3, the construction 10B shows a continuously extending transversely corrugated or pleated tape 22 arranged for helically wound relation to inner conductor 11.

The spacer members 12, 22 may be applied to inner conductor 10, 10A or 10B in any suitable manner, as by insertion, winding or the like. The flat tape 13, shown in FIG. 2, may also be applied to the outer edge portions of the helical spacer member 22.

As various changes might be made in the herein disclosed embodiments of the invention without departing from the spirit thereof, it is understood that all matter herein shown or described shall be deemed illustrative and not limiting except as set forth in the appended claims.

We claim:
1. In a coaxial cable having an inner conductor, dielectric spacer means mounted on said inner conductors, said spacer means comprising a tape having corrugations extending transversely thereof and flat tape means secured to at least one edge of said corrugated tape, said corrugated tape being arranged with edge portions thereof in contact with the outer surface of said inner conductor.

2. In a cable as in claim 1 wherein said corrugated tape extends helically about said inner conductor.

3. In a cable as in claim 1 wherein said corrugated tape is in annular form, the inner annular edge thereof abutting said inner conductor.

4. In a cable as in claim 1 wherein the amplitude of the corrugations of said tape are different at the opposite edges of said tape, the corrugations at the edge of the tape abutting said inner conductor having an amplitude less then that of the corrugations at the edge of the tape remote from said inner conductor.

5. In a cable as in claim 4 wherein the amplitude of the corrugations at the edge of the tape abutting said inner conductor is substantially zero.

References Cited

UNITED STATES PATENTS 1,885,168  11/1932  Affel _____ 174—29

FOREIGN PATENTS 451,184  9/1927  Germany.
824,140  2/1938  France.
897,273  11/1953  Germany.

ELLIOT A. GOLDBERG, Primary Examiner

A. T. GRIMLEY, Assistant Examiner

U.S. Cl. X.R.

174—29